United States Patent

[11] 3,565,360

[72] Inventor Junichi Ura
 Yokohama, Japan
[21] Appl. No. 819,841
[22] Filed Apr. 28, 1969
[45] Patented Feb. 23, 1971
[73] Assignee Victor Company of Japan, Limited
 Yokohama City, Japan
[32] Priority Apr. 30, 1968
[33] Japan
[31] 43/28,522

[54] REEL DEVICE
 9 Claims, 4 Drawing Figs.
[52] U.S. Cl. .................................................. 242/68.3
[51] Int. Cl. .................................................. B65h 17/02
[50] Field of Search ..................................... 242/68.3

[56] References Cited
UNITED STATES PATENTS
2,928,620 3/1960 Stavrakis et al. ............... 242/68.3
3,198,454 8/1965 Gorsek et al. ................. 242/68.3

Primary Examiner—Nathan L. Mintz
Attorney—Louis Bernat

ABSTRACT: A reel device can be moved outwardly to press against the reel and secure the same in place by merely rotating a rotary means in one direction. When the reel is to be removed, the reel securing means can be moved inwardly by rotating the rotary means in the opposite direction. This reel device permits the reel to be readily mounted and removed, and it holds the reel positively in place to prevent vibration while it is rotating.

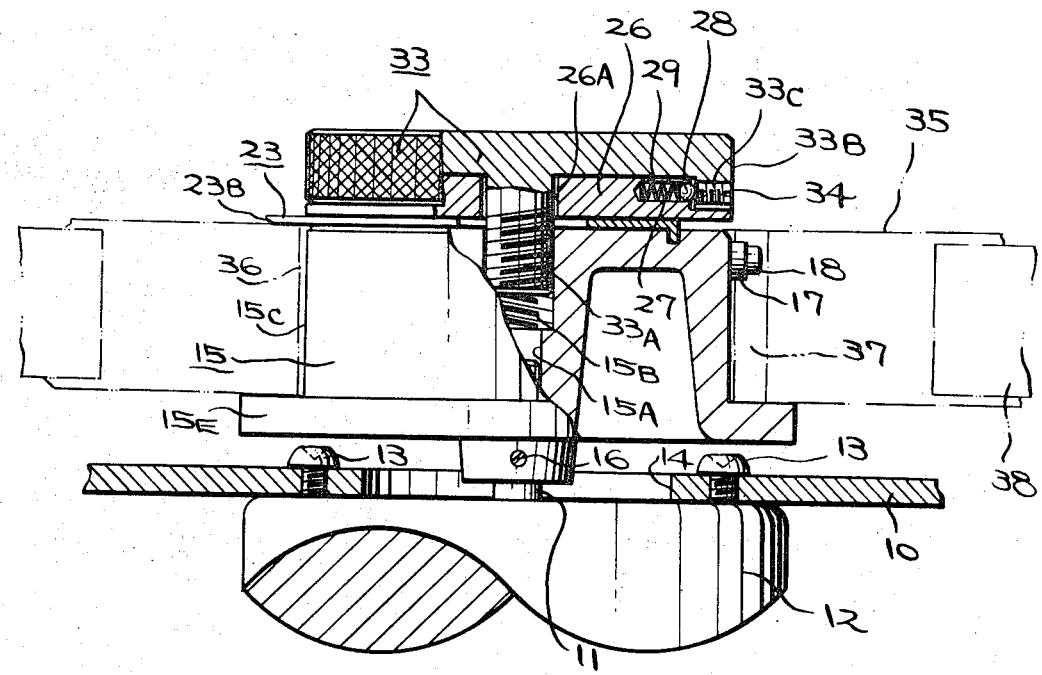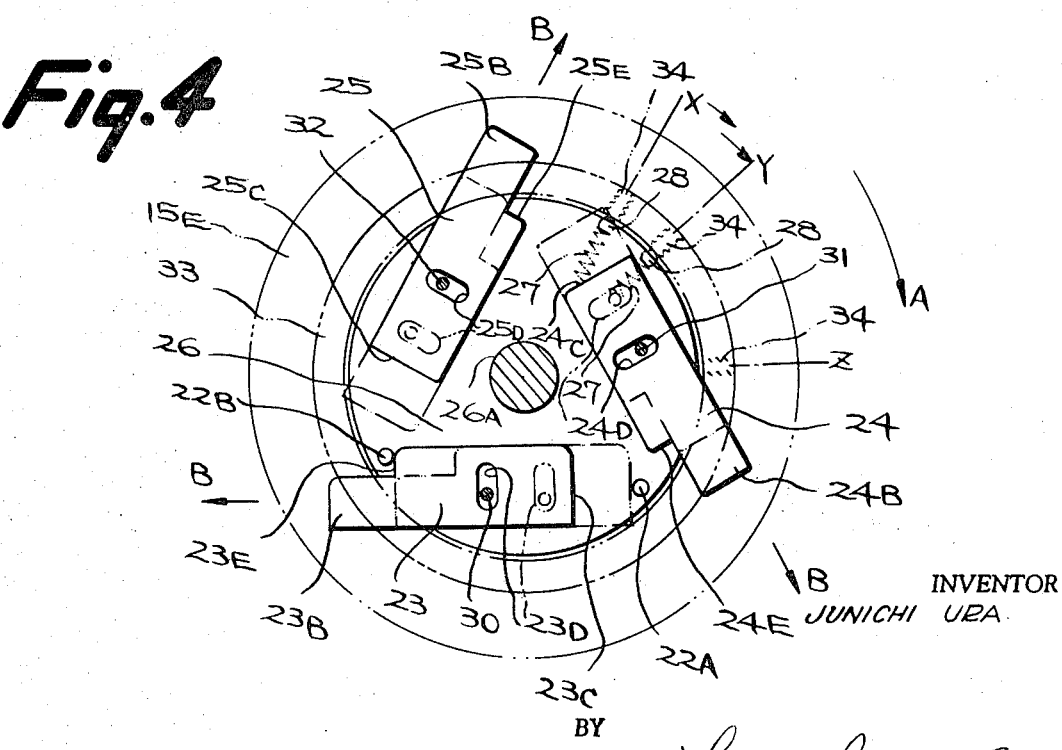

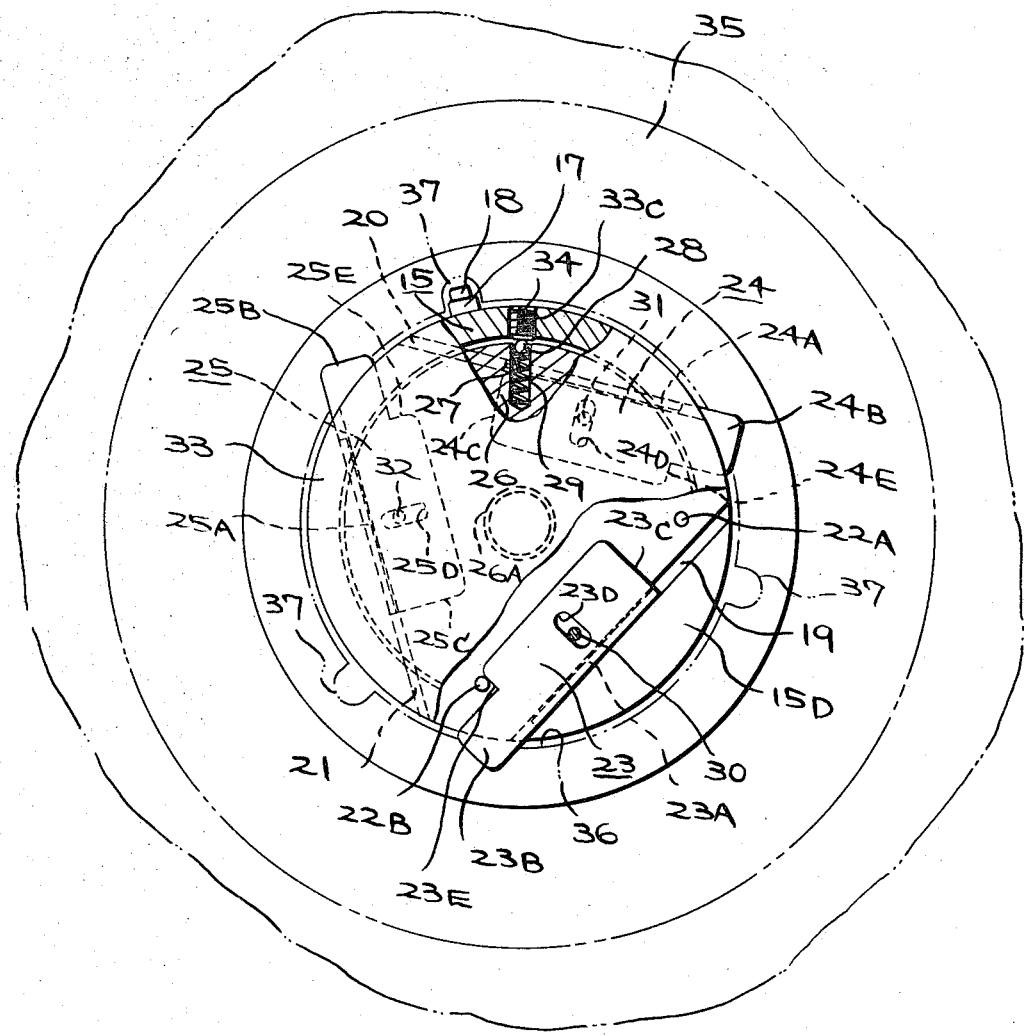

REEL DEVICE

DISCLOSURE

The present invention relates to reel securing devices, and in particular with a reel device which facilitate mounting and removal of a reel for magnetic tape, movie film and the like and which fixes the reel in place on a reel holder.

One type of device for securing a reel to a reel holder, known in the art, uses the biasing force of a spring. This device has disadvantages. If the spring has a great biasing force, it is difficult to mount and remove a reel. If the biasing force is small, then the reel tends to vibrate during rotation. It has hitherto been difficult to obviate these two problems by effecting a compromise between the two requirements.

Accordingly, attempts to overcome these problems have resulted in complication of the construction involved, with a multiplicity of component parts. Moreover, there are difficulties in assembling and adjusting these parts, and particularly in adjusting the tension of the spring to an optimum level.

The present invention overcomes this disadvantage. The reel device of the present invention is constructed so that rotation of a rotary means in one direction causes the reel securing means to project outwardly from inside the device and to press against the upper surface of the reel. This secures the reel in place when the reel is to be mounted. A rotation of the rotary means in the reverse direction causes the reel securing means to move inwardly when the reel is to be removed. This arrangement facilitates the mounting and removal of the reel, and it prevents vibration of the reel during rotation.

A principal object of the invention is to provide a reel device which fixes and holds a reel in place by a simple construction.

Another object of the invention is to provide a reel device which facilitates mounting and removal of a reel.

Another object of the invention is to provide a reel device in which reel is secured in place by rotating a rotary means in one direction for moving a lacking means outwardly of the device.

Still another object of the invention is to provide a reel holding device in which a reel can be readily mounted and removed by operatively associating reel securing means with a rotary means so that the reel securing means can be moved into the device.

Additional objects as well as features and advantages of the invention will become apparent from consideration of the description set forth hereinafter in conjunction with the accompanying drawings, in which:

FIG. 1 is a fragmentary longitudinal sectional side view of one embodiment of a device constructed according to this invention;

FIG. 2 is a fragmentary transverse sectional view of the embodiment shown in FIG. 1, with certain parts being shown in cross section;

FIG. 4 is a view of the essential portions in explanation of the operation of the device.

Figure 3:
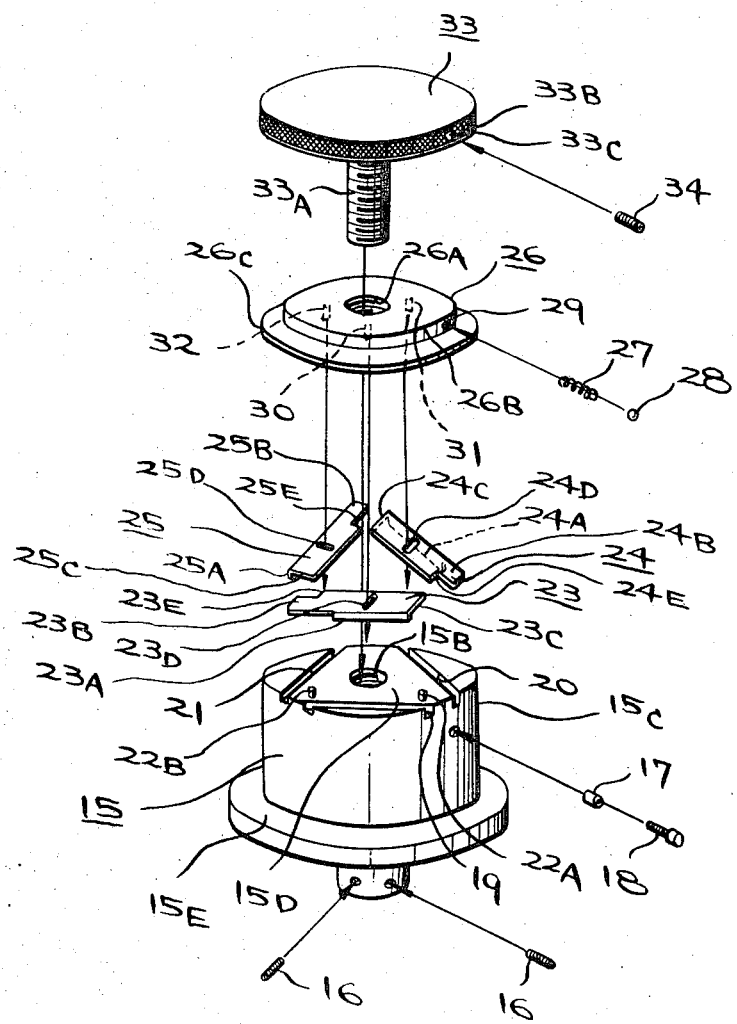
FIG. 3 is an exploded perspective view showing the essential portions of the embodiment of FIG. 1.

In FIGS. 1 to 3, a motor 12 has a rotary shaft 11. The motor is mounted on the underside of a base 10 by screws 13. The shaft 11 of motor 12 extends through and upwardly above an opening 14 formed in the base 10. An upper end portion of the rotary shaft 11 fits into a lower portion 15A of a center axial bore formed in a reel holder 15. The reel holder 15 is firmly fixed to the upper end portion of the rotary shaft 11. A threaded bore portion 15B communicating with said lower bore portion 15A is formed in an upper portion of the reel holder 15. Setscrews 16 lock the reel holder 15 to shaft 11 of motor 12. A reel rotation stopping member 17 is fixed to an outer circumferential surface 15C of the reel holder 15 by a screw 18.

The reel holder 15 is formed on its upper surface 15D (FIG. 2) with three grooves 19, 20 and 21 arranged in the form of an equilateral triangle. Two limiting pins 22A and 22B are mounted on the upper surface 15D and spaced apart from each other a predetermined distance longitudinally of the groove 19. The reel holder 15 has a flange 15E projecting outwardly from the lower end thereof.

A reel securing plate is positioned in the groove 19 on the top of the reel holder 15. More particularly, a bent portion 23A extends downwardly from one side of the reel securing plate 23. Portion 23A is slidably received in the groove 19. The range of the sliding motion of the reel securing plate 23, is limited by the limiting pins 22A and 22B. The reel securing plate 23 is formed at one end with a projecting portion 23B and at the other end with an engaging end 23C adapted to engage the pin 22A. The reel securing plate 23 is formed with a slot 23D disposed substantially in the center and extending transversely of the plate. An offset portion 23E is adapted to engage the pin 22B and is formed on the other side of the plate 23 substantially in the center between the projecting portion 23B and the slot 23D. The downwardly bent portion 23A is provided in the portion of the one side which remains after the projecting portion 23B is cut away.

The grooves 20 and 21 also slidably receive therein bent portions 24A and 25A of similar reel securing plates 24 and 25, respectively. These plates are of the same shape and configuration as the reel securing plate 23. The reel securing plates 24 and 25 are also formed with engaging ends 24C and 25C, slots 24D and 25D, and offset portions 24E and 25E, respectively.

A rotary holder 26 disposed over the reel securing plates 23, 24 and 25 is formed at its center with an opening 26A. A hole 29 is provided for receiving a spring 27 and a steel ball 28, the hole being formed in an outer peripheral portion 26B of the rotary holder 26. On the underside of the rotary holder 26 are pins 30, 31 and 32 which are engaged in the slots 23D, 24D and 25D formed in the reel securing plates 23, 24 and 25 respectively.

A rotary knob 33 is disposed over the rotary holder 26. A shaft connected to the center of the underside of the knob 33 has an externally threaded forward end portion 33A. This shaft extends downwardly through the opening 26A formed in the center of the rotary holder 26. Thus, the externally threaded forward end portion 33A may be threadably received in the threaded bore portion 15B of the reel holder 15. The rotary knob 33 has a knurled outer peripheral portion 33B which is formed with a threaded opening 33C for receiving therein a screw 34 for holding the steel ball 28 in place between the spring 27 and the screw 34.

A reel 35, (FIGS. 1 and 2) is formed with a center opening 36 for fitting over the reel holder 15. The inner sidewall of opening 36 has a plurality of axially arranged cutout portions 37. The reel 35 rotates with the reel holder 15, as a unit, because the former is fixed in place over the latter by means of the reel rotation stopping member 17 fixed to the outer circumferential surface 15C of the reel holder 15. Member 17 fits into one of the cutout portions 37 formed on the inner sidewall of the reel 35. A tape 38, such as magnetic tape, is wound on the reel 35.

The operation of the device, constructed as aforementioned, will now be explained with reference to the drawings. When the reel is to be mounted, the center opening 36 of the reel 35 is fitted over the reel holder 15. One of the cutouts 37 engages the reel rotation stopping member 17, and the reel 35 rests on the upper surface of the flange 15E. Then, the rotary knob 33 is rotated. The externally threaded shaft portion 33A is in threadable engagement with the threaded bore portion 15B of the reel holder 15. Since the screw 34 is in engagement with the steel ball 28, urged outwardly by the biasing force of the spring 27, the rotary holder 26 also rotates with the rotary knob 33. When the rotary holder 26 rotates, the pins 30, 31, and 32 also rotate.

As shown in FIG. 4, if the rotary knob 33 is rotated in the direction of arrow A, the steel ball receiving screw 34 moves from a position indicated by the arrow X to a position indicated by the arrow Y. Then, the pins 30, 31 and 32 rotate from positions shown in dotted lines to positions shown in solid lines in the figure. As the pins rotate, the reel securing plates 23, 24 and 25 also move in a sliding motion, in the direction of arrows B, along the grooves 19, 20 and 21 respectively. Movement is from positions shown in dotted lines to positions shown in solid lines. When the steel ball receiving screw 34 has moved to a position indicated by the arrow Y, the offset portion 23E of the reel securing plate 23, for example, engages the pin 22B. The projecting portions 23B, 24B and 25B of the reel securing plates 23, 24 and 25 respectively stick outwardly from the outer circumferential surface 15C of the reel holder 15 to be positioned above the upper surface of the reel 35. The rotary holder 26 stops rotating at this time.

The rotary knob 33 maybe further rotated in the direction of arrow A so as to cause the steel ball receiving screw 34 to move from the position shown by the arrow Y to a position shown by the arrow Z. Then the steel ball receiving screw 34 is brought out of engagement with the steel ball 28. The rotary knob 33 rotates while the steel ball 28 of the rotary holder 26 stays in the position shown by the arrow Y in FIG. 4. Since the rotary knob 33 is in threadable engagement with the reel holder 15, the rotary knob 33 moves downwardly as it rotates and gradually presses the reel holder 26 downwardly until the projecting portions 23B, 24B and 25B of the reel securing plates 23, 24 and 25 respectively press against the upper surface of the reel 35, thereby securing the reel in place.

When the reel 35 is to be removed, the rotary knob 33 is rotated in a direction opposite to the direction of arrow A as shown in FIG. 4. As the rotary knob 33 is rotated from the position shown by the arrow Z to the position shown by the arrow Y, the rotary knob 33 gradually moves upwardly. The force with which it presses against the rotary holder 26 is gradually removed. When the steel ball receiving screw 34 reaches the position indicated by the arrow Y, the steel ball receiving screw 34 is again brought into engagement with the steel ball 28.

Further rotation of the rotary knob 33 toward the position shown by the arrow X causes the rotary holder 26 to rotate with the rotary knob 33. As the rotary holder 26 rotates, the pins 30, 31 and 32 also rotate. As a result, the reel securing plates 23, 24 and 25 move in sliding motion in directions opposite to the direction of arrows B. Movement is from the positions shown in solid lines to the positions shown in broken lines. The rotary holder 26 stops rotating when the engaging end 23C of the reel securing plate 23, for example, engages the pin 22A. When the rotary holder 26 stops rotating, the projecting portions 23B, 24B and 25B of the reel securing plates 23, 24 and 25 respectively are positioned inwardly of the outer circumferential surface 15C of the reel holder 15. Accordingly, it is possible to readily remove the reel 35 from the reel holder 15 by simply moving the reel 35 upwardly.

From the foregoing description, it will be appreciated that, according to this invention, the reel device comprises the reel holder 15 for holding the reel 35 responsive to a suitable reel rotation stopping member. The holder rotates with the reel as a unit. The rotary knob 33 threadably connected to the reel holder. The rotary holder 26 is interposed between the rotary knob 33 and the reel holder 15 for rotation with the rotary knob within a predetermined range. The reel securing plates 23, 24 and 25 are engaged by pins 30, 31 and 32 respectively. These pins are fixed to the rotary holder 26 and include projecting portions which extend outwardly of the device and press against the upper surface of the reel to fix the reel in place when the rotary knob 33 is rotated in one direction. These portions move inwardly into the device as the rotary knob is rotated in the opposite direction. This construction permits the reel to be readily secured in place.

When the reel is to be mounted, it is merely necessary to rotate the rotary knob 33 in one direction to cause the projecting portions of the reel securing plates 23, 24 and 25 to extend outwardly of the device and press against the upper surface of the reel and secure the same in place. The reel 35 can readily be removed by turning the rotary knob 33 in the opposite direction to cause the projecting portions of the reel securing plates to move inwardly into the device.

It will be evident that the reel device according to this invention is simple in construction and yet positively secures the reel in place, so that the reel never vibrates while rotating and can readily be mounted or removed.

The invention has been described with reference to an embodiment in which the engaging end 23C and the offset portion 23E of the reel securing plate 23 engage the pins 22A and 22B respectively. It is to be understood, however, that the invention includes other embodiments in which the engaging ends 24C and 25C and the offset portions 24E and 25E of other reel securing plates 24 and 25 respectively engage the pins 22A and 22B respectively.

It is also to be understood that, while the invention has been described with reference to a preferred embodiment, the invention is not limited thereto, and that many changes and variations may be made within the spirit and scope of the invention.

I claim:

1. A reel device comprising a reel holder holding a reel and rotating with said reel as a unit, rotary means having an inward and an outward connection to said reel holder, a rotating member interposed between said reel holder and said rotary means for rotation with said rotary means as a unit within a predetermined range, and reel securing means maintained in engagement with said rotating member and mounted for sliding motion, said reel securing means moving outwardly to project out of the reel holder and press against the upper surface of the reel to secure the reel in place when the rotary means is rotated in one direction, and said reel securing means moving inwardly to be withdrawn into the reel holder and released from the pressing engagement with the reel when the rotary means is rotated in the opposite direction.

2. A reel device as defined in claim 1 in which said reel securing means comprises a plurality of engaging members and slots for receiving said engaging members to hold them in engagement with said rotating member, a portion moving out of and into said reel holder, and a portion slidably received in a groove formed in said reel holder.

3. A reel device as defined in claim 1 further comprising means for resiliently rotating said rotary means with respect to said rotating member.

4. A reel device as defined in claim 1 characterized in that a reel rotation stopping means provided on the outer circumferential surface of the reel holder is engaged in at least one cutout formed in the inner sidewall of the reel so as to thereby hold the reel on the reel holder.

5. A reel device as defined in claim 1 in which said rotary means and said reel holder are maintained for rotation as a unit by threadable connection of an externally threaded portion of a shaft connected to the center of the underside of the rotary means and extending downwardly therefrom with a center axial threaded bore portion formed in an upper portion of said reel holder.

6. A reel device comprising a reel holder holding a reel and rotating with said reel as a unit, rotary means having an inward and an outward connection to said reel holder, a rotating member interposed between said reel holder and said rotary means for rotation with said rotary means as a unit within a predetermined range, and reel securing means including a portion moving outwardly and inwardly of the outer circumferential surface of said reel holder when said rotary means is rotated, a portion slidably received in a groove formed in said reel holder, and at least one engaging member and a slot for receiving said engaging member provided in said rotating member.

7. A reel device as defined in claim 6 in which said reel securing means is slidably mounted such that the range of its sliding motion is limited by a pair of limiting members arranged on the reel holder substantially axially of the groove and spaced apart a predetermined distance from each other.

8. A reel device as defined in claim 6 which comprises three reel securing means of identical shape and configuration, said reel holder being formed on its upper surface with three grooves arranged substantially in the form of a triangle, said reel securing means being slidably fitted in said grooves respectively, said rotating member being provided with three engaging members engaged in slots formed in said reel securing means respectively.

9. A reel device as defined in claim 8 further comprising a pair of limiting member arranged on the reel holder substantially axially of one of said grooves and spaced apart a predetermined distance from each other.